United States Patent [19]

Baker

[11] 3,793,580

[45] Feb. 19, 1974

[54] D. C. STATIC SWITCH CIRCUIT WITH A MAIN SWITCH DEVICE AND A POWER SHARING CIRCUIT PORTION

[75] Inventor: Donal E. Baker, Lima, Ohio

[73] Assignee: Westinghouse Electric Corporation, Pittsburgh, Pa.

[22] Filed: May 23, 1972

[21] Appl. No.: 256,134

[52] U.S. Cl. .......... 323/9, 323/25

[51] Int. Cl. .......... G05f 1/58

[58] Field of Search ... 307/296, 297, 255, 241, 242; 317/20, 33 VR, 33 R; 323/4, 9, 19, 22 T, 23, 25, 38

[56] References Cited

UNITED STATES PATENTS

| | | | |
|---|---|---|---|
| 3,096,475 | 7/1963 | Brooks | 323/22 T |
| 3,509,448 | 4/1970 | Bland | 323/9 |
| 3,521,150 | 7/1970 | Bates | 323/9 |

*Primary Examiner*—A. D. Pellinen
*Attorney, Agent, or Firm*—G. H. Telfer

[57] ABSTRACT

In a static switch circuit with a power sharing circuit portion operable to dissipate power so the required dissipation is shared with the main power switch in the circuit, the power sharing circuit portion has an NPN transistor and a PNP transistor connected in a white circuit configuration that is provided with bias signals from the center tap of the primary winding of the transformer used in the oscillator of the driver circuit for the main power switch.

6 Claims, 1 Drawing Figure

PATENTED FEB 19 1974 3,793,580
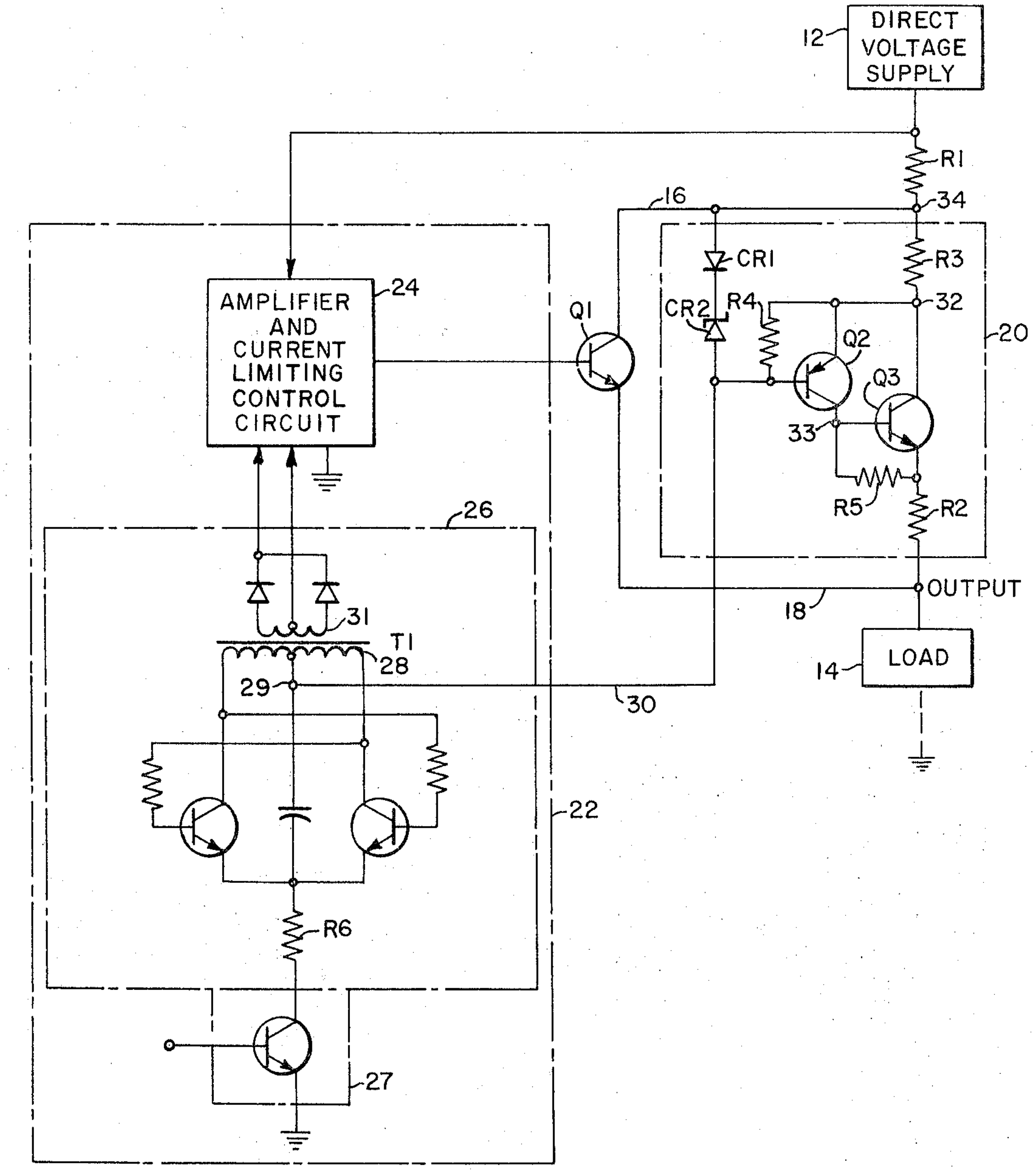

D. C. STATIC SWITCH CIRCUIT WITH A MAIN SWITCH DEVICE AND A POWER SHARING CIRCUIT PORTION

BACKGROUND OF THE INVENTION

The invention relates to static DC switch circuits for use in controlling power in electrical systems.

The present invention is an improvement on the invention disclosed in copending application Ser. No. 124,232, filed Mar. 15, 1971, now U.S. Pat. No. 3,697,860, issued Oct. 10, 1972 by the present inventor and assigned to the present assignee. That application should be referred to for background with respect to DC static switch circuits with a power sharing circuit portion for sharing power dissipation with the main switch device.

In the specific form of the invention disclosed in the copending application, the power sharing circuit portion comprises a pair of transistors connected in a Darlington amplifier configuration. The Darlington amplifier is driven by biasing signals developed from a secondary winding on the transformer of the oscillator in the driver circuit for the main transistor switch. This arrangement has been successfully used and provides significant improvements over the prior art. However, the present invention came about in a continuing effort to improve the performance and reduce the cost of static switch circuits.

In the previously disclosed circuitry, (the reference numerals refer to FIG. 6 of the copending application) drive current is supplied to the transistors of the power sharing circuit (Q3 and Q2) through a resistor (R8) from a secondary winding of the drive circuit transistor (T1) with a pair of diodes (CR6 and CR7) connected as a full wave rectifier. The value of the drive current is reflected to the primary winding of T1 and shows up as a DC component of the primary current. The power loss due to the drive current for the power sharing circuit is approximately $$P = I/N_p/N_s\ (V_{cc})$$

where $I$ is the drive current for the power sharing circuit, $N_p/N_s$ is the primary to secondary turns ratio of the transformer, and $V_{cc}$ is the supply voltage. For a typical 10 ampere, 28 volt DC power controller, I is approximately 0.14 ampere, the ratio of the turns is 4, and $V_{cc}$ is 28 volts. Hence, P is 0.98 watts. Since the power controller total dissipation is typically about 10 watts, without the power sharing circuit, it is evident that a significant increase in dissipation, or loss in efficiency, will result if it is used in the form shown in the copending application. The electrical efficiency is an important parameter in solid state power controllers and continual improvement is sought due to the relatively low total dissipation of competitive mechanical circuit breakers.

SUMMARY OF THE INVENTION

In accordance with this invention, a static switch circuit is provided with an improved power sharing circuit portion operable to dissipate power so that required dissipation is shared with the main power switch in the circuit. The power sharing circuit portion of this invention has an NPN transistor and a PNP transistor connected in a White circuit configuration. Bias signals to the power sharing circuit are supplied from the center tap of the primary winding of the transformer used in the oscillator of the driver circuit for the main power switch.

The present invention provides a simpler circuit with fewer components and at a lower cost than that specifically disclosed in the copending application, and hence provides an even greater overall improvement in economy over the prior art. Yet, the present invention provides even improved electrical efficiency in that the power dissipation incurred through the use of the power sharing network's biasing circuit can be zero as compared with approximately one watt of power to drive the power sharing circuit of the copending application.

THE DRAWING

The single FIGURE is a circuit schematic of an embodiment of the present invention.

DESCRIPTION OF THE PREFERRED EMBODIMENTS

Referring to the drawing, an improved circuit in accordance with this invention is shown. A static switching and amplifying device, transistor Q1, which is an NPN transistor in the example, is the main power transistor between a direct voltage supply 12 and a load 14. Transistor Q1 is connected with its collector connected by a supply circuit line 16 to a resistive shunt R1 which in turn is connected to supply 12. The emitter of Q1 is connected to a load circuit line 18. Also connected between lines 16 and 18, in parallel with transistor Q1, is a power sharing circuit portion 20 which will be subsequently described in detail.

The Figure also shows a circuit portion 22, referred to for convenience as a drive circuit, that includes a block 24 identified as an amplifier and current limiting control circuit, a group of components enclosed in box 26 which will be referred to as a drive oscillator, and a box 27 which will be referred to as an ON/OFF control circuit. In substantial part the elements of circuit portion 22 may be like elements of the apparatus disclosed in the above-identified copending application; particular reference is made to FIG. 6 of that application and the elements in circuit portions 15, 16 and 28 thereof. However, the connections to the drive oscillator 26 of the present invention are somewhat modified from that previously disclosed as will be discussed. Further information with respect to the circuit portion 22 may also be found by referring to copending application Ser. No. 124,310, filed Mar. 15, 1971, now U.S. Pat. No. 3,710,231, issued Jan. 9, 1973 by the present inventor and assigned to the present assignee. The drive oscillator circuit 26 includes a free-running core timed oscillator, sometimes referred to as a Royer oscillator, that includes transformer T1. In accordance with this invention, the primary winding 28 of transformer T1 has its center tap 29 connected on line 30 to the input to the power sharing circuit portion 20.

Other than the manner in which the drive to the power sharing circuit 20 is obtained from the oscillator 26, the latter may be as described in the copending application and will not be detailed herein. The power sharing circuit portion 20 includes a pair of transistor Q2 and Q3 of opposite polarity that are connected in the known manner of a White amplifier. Specifically, a PNP transistor Q2 has its emitter connected with the collector of the NPN transistor at point 32. The collector of the PNP transistor is connected to the base of the NPN transistor at point 33. Point 32 is also connected through a resistor R3 to point 34 which is adjacent the current sensing resistive shunt R1. A resistor R4 is connected between the base and emitter of Q2 and an additional resistor R5 is connected between the base and emitter of Q3. A further resistor R2 is connected between the emitter of Q3 and the load circuit line 18. Other components in the power sharing circuit 20 include a diode rectifier CR1, serially coupled with an oppositely poled Zener diode CR2 in a circuit branch between the supply circuit line 16 and the base of Q2.

In accordance with this invention, bias current on line 30 to saturate transistors Q2 and Q3 of the power sharing circuit portion 20 is developed by the oscillator input current to the center tap 29. The value of this current is comprised of the reflected value of the current in secondary winding 31 and the oscillator losses. This value of oscillator current is sufficient to drive Q2 and Q3 and does not need to be increased in magnitude. In addition, the voltage drop across resistor R3 and the base-emitter junction of Q2 is less than 1 volt for nominal conditions. This voltage drop is low enough that it has no effect on the performance or design of the remaining circuitry. As a result, power sharing with the main switch Q1 can be obtained with no sacrifice in power dissipation by using the disclosed circuit. In addition a component savings of four, plus one transformer winding, can be realized as compared with the technique in the above referred to copending application, Ser. No. 124,232 (U.S. Pat. No. 3,697,860).

Components CR2 and R3 of the power sharing circuit portion 20 are provided to control the current limiting level of the power sharing circuit portion in the manner of the operation of the power sharing circuit of the copending application, Ser. No. 124,232 (U.S. Pat. No. 3,697,860). Diode rectifier CR1 is used to temperature stabilize the sharing circuit current limiting level by compensating the base-emitter voltage drop of Q1. Appropriate values for R2 and R3 are determined as described for the corresponding elements of the circuit of the copending application.

Consequently, there has been disclosed herein an improved power sharing circuit that imposes no sacrifice in electrical efficiency or power loss and which reduces circuit complexity and cost.

By way of further example, the following components are suitably used in the power sharing circuit 20 of this invention, while other components of the power switch may be as identified in Ser. No. 124,232 (U.S. Pat. No. 3,697,860) (FIG. 6), for a 10 ampere switch operating on a nominal supply voltage of 28 V. D.C.

| | |
|---|---|
| Transistor Q2 | 2N3790 |
| Transistor Q3 | 2N3773 |
| Resistor R2 | 4.5 ohms |
| Resistor R3 | 0.4 ohms |
| Resistor R4 | 500 ohms |
| Resistor R5 | 100 ohms |
| Diode CR1 | 1N4001 |
| Zener diode CR2 | 5.6 v. breakdown |

For a net zero additional power dissipation incurred by the power sharing circuit 20, resistor R6 in the driver circuit 22 can be adjusted in value. Hence, for the specific example including the above table of components, R6 may suitably be 60 ohms instead of the 80 ohms resistor R23 given as an example in the embodiment of the copending application.

I claim:

1. Apparatus to control the application of DC power from a supply to a load comprising: a first static switching device having first and second electrodes for connection in a first circuit branch between a direct voltage source and a load to be supplied by the source and also having a third control electrode; a power sharing circuit portion connected in parallel with said first and second electrodes of said device, said power sharing circuit portion comprising a transistor having emitter, collector and base electrodes; a driver circuit portion connected to said third electrode of said device; said driver circuit portion comprising a drive oscillator with a transformer having a primary winding with a center tap and having a secondary winding; and means to drive said power sharing circuit portion comprising a line connected from said center tap of said primary winding to the base of said transistor of said power sharing circuit portion.

2. The subject matter of claim 1 wherein: said power sharing circuit comprises a PNP transistor and an NPN transistor, the emitter of PNP transistor and the collector of said NPN transistor being connected together and the collector of said PNP transistor and the base of said NPN transistor being connected together.

3. The subject matter of claim 9 wherein: the common connection of the emitter of said PNP transistor and the collector of the NPN transistor is resistively connected to a first point for connection to a DC supply, and the emitter of said NPN transistor is resistively connected to a second point for connection to a load.

4. The subject matter of claim 3 further comprising: a resistance connected across the emitter and base of said PNP transistor and an additional resistance connected across the emitter and base of said NPN transistor.

5. The subject matter of claim 3 wherein: said power sharing circuit portion further comprises means connected between said first point and the input of said PNP transistor for controlling the current limiting level of the power sharing circuit portion.

6. The subject matter of claim 5 wherein: said means for controlling the current limiting level of the power sharing circuit portion comprises a diode rectifier poled in the forward direction for current from the source and a Zener diode serially connected in reverse polarity with said diode rectifier.

* * * * *